(12) United States Patent
Nishimiya

(10) Patent No.: US 11,471,955 B2
(45) Date of Patent: Oct. 18, 2022

(54) CHUCK CORRECTION METHOD

(71) Applicant: KITAGAWA IRON WORKS CO., LTD, Fuchu (JP)

(72) Inventor: Tamio Nishimiya, Fuchu (JP)

(73) Assignee: KITAGAWA IRON WORKS CO., LTD, Fuchu (JP)

( * ) Notice: Subject to any disclaimer, the term of this patent is extended or adjusted under 35 U.S.C. 154(b) by 384 days.

(21) Appl. No.: 16/635,285

(22) PCT Filed: Jun. 15, 2018

(86) PCT No.: PCT/JP2018/022862
§ 371 (c)(1),
(2) Date: Jan. 30, 2020

(87) PCT Pub. No.: WO2019/031059
PCT Pub. Date: Feb. 14, 2019

(65) Prior Publication Data
US 2020/0368825 A1  Nov. 26, 2020

(30) Foreign Application Priority Data

Aug. 7, 2017  (JP) .............................. JP2017-152215

(51) Int. Cl.
*B23B 31/36* (2006.01)
*B23B 31/16* (2006.01)

(52) U.S. Cl.
CPC .............. *B23B 31/36* (2013.01); *B23B 31/16* (2013.01)

(58) Field of Classification Search
CPC .................................. B23B 31/16; B23B 31/36
See application file for complete search history.

(56) References Cited

U.S. PATENT DOCUMENTS 2,447,711 A * 8/1948 Mikis ...................... B23B 31/36
                                                                                279/5
2,984,494 A * 5/1961 Alston ..................... B23B 31/36
                                                                                279/6
(Continued)

FOREIGN PATENT DOCUMENTS

CH      293499 A    9/1953
CN     1370648 A    9/2002
(Continued)

OTHER PUBLICATIONS

International Search Report dated Sep. 18, 2018 in corresponding International Application No. PCT/JP2018/022862; 2 pgs.
(Continued)

*Primary Examiner* — Eric A. Gates
(74) *Attorney, Agent, or Firm* — Maier & Maier, PLLC

(57) ABSTRACT

The present disclosure improves the accuracy of matching the center of the workpiece with the rotation center of the chuck. It provides a chuck correction method for a chuck including a body, a plunger, and jaws, the body including a rear body and a front body provided in a front side of the rear body, the plunger provided inside the body and configured to move along an axis of the body, and the jaws each configured to move in a radial direction of the axis while guided by the front body along when the plunger moves, the chuck correction method including: a correction step including moving the front body in the radial direction of the axis with a position of the rear body keeping with respect to the axis in a state that a workpiece is clamped in the jaws.

7 Claims, 9 Drawing Sheets

(56) References Cited

U.S. PATENT DOCUMENTS

| | | | |
|---|---|---|---|
| 3,088,746 A * | 5/1963 | Highberg | B23B 31/16004 279/6 |
| 3,129,950 A * | 4/1964 | Galler | B23B 31/36 82/170 |
| 3,178,192 A | 4/1965 | Sampson | |
| 3,259,394 A | 7/1966 | Buck | |
| 3,357,711 A * | 12/1967 | Fischer | B23B 31/36 279/6 |
| 3,460,847 A * | 8/1969 | Toth | F16B 9/056 82/170 |
| 3,460,849 A | 8/1969 | Highberg | |
| 4,645,219 A * | 2/1987 | Link | B23B 31/14 279/157 |
| 6,425,584 B1 | 7/2002 | Stickney | |
| 9,283,645 B2 * | 3/2016 | Schraeder | B23Q 3/183 |
| 2001/0011800 A1 | 8/2001 | Hanai | |
| 2002/0113381 A1 | 8/2002 | Casel et al. | |

FOREIGN PATENT DOCUMENTS

| | | | |
|---|---|---|---|
| CN | 200998775 Y | | 1/2008 |
| CN | 201483016 U | | 5/2010 |
| CN | 101829794 A | | 9/2010 |
| CN | 202317093 U | | 7/2012 |
| CN | 104722789 A | * | 6/2015 |
| CN | 205363682 U | | 7/2016 |
| DE | 2057900 A1 | | 5/1972 |
| EP | 1184111 A1 | | 3/2002 |
| JP | 2003-001507 A | | 1/2003 |
| JP | 2009-184083 A | | 8/2009 |
| JP | 2011-110676 A | | 6/2011 |
| JP | 2015-058528 A | | 3/2015 |
| TW | 510836 B | | 11/2002 |

OTHER PUBLICATIONS

Office Action dated May 21, 2020 in corresponding Chinese Application No. 201880040247.2; 11 pages including English-language translation.

Extended European Search Report dated Jul. 29, 2020, in connection with corresponding EP Application No. 18842892.4 (12 pp.).

Taiwanese Office Action dated Sep. 22, 2021, in connection with corresponding TW Application No. 107121081 (9 pp., including machine-generated English translation).

* cited by examiner

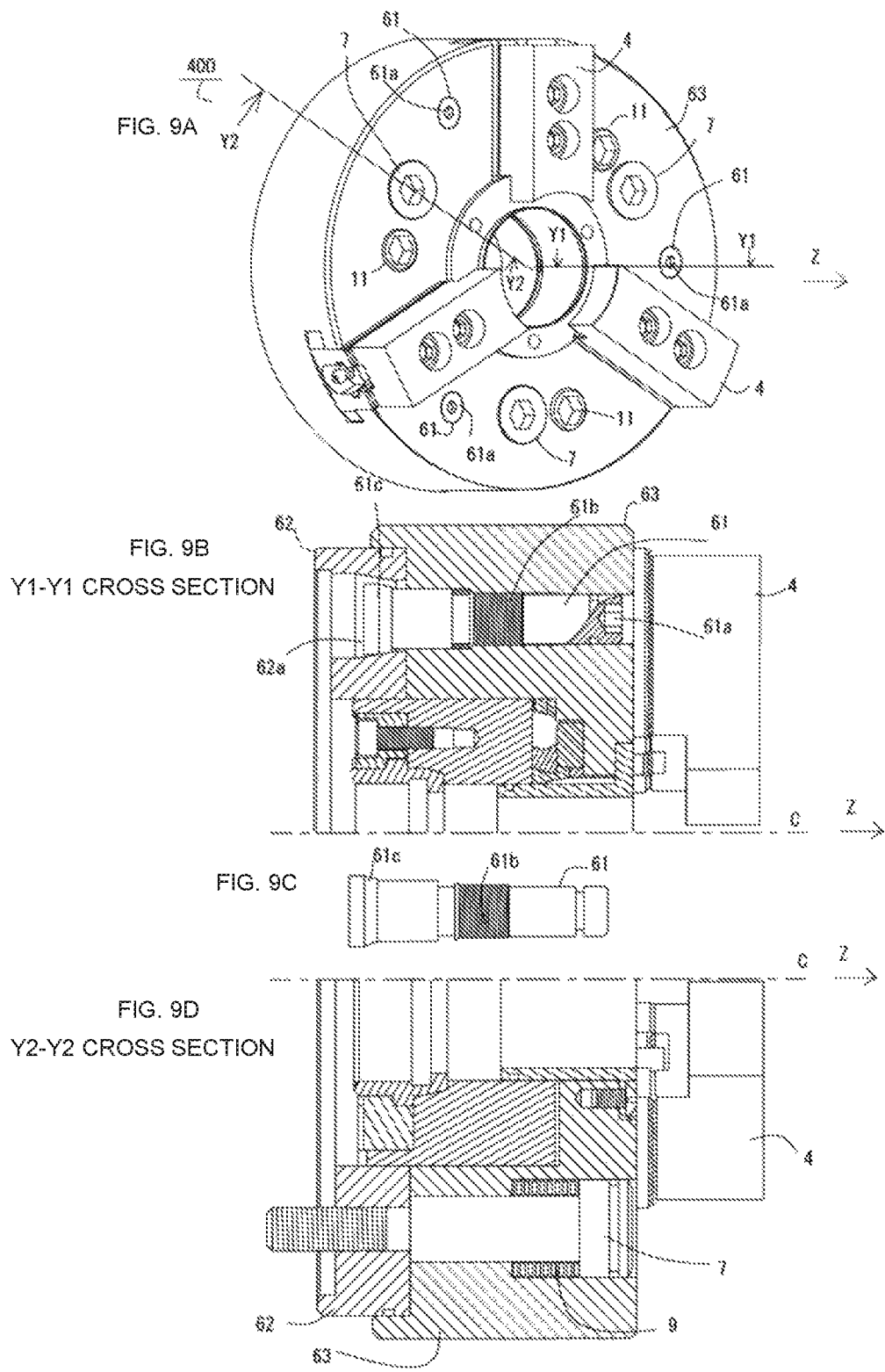

CHUCK CORRECTION METHOD

TECHNICAL FIELD

The present invention relates to a chuck correction method used for machine tools.

BACKGROUND ART

On-machine forming with jaws provides high accuracy clamping workpieces. In on-machine forming, clamping surfaces of jaws are machined while clamping forming plugs, and thus the rotation centers of chucks and the centers of workpieces coincide with high accuracy. However, since clamping surfaces of jaws are commonly machined in a state where parts closer to chuck bodies than parts of the clamping surfaces of jaws are clamped, positions of the clamping surfaces and positions in which forming plugs are clamped are different. Thus, when workers attach workpieces to chucks, the centers of workpieces may be slightly shifted from the rotation centers of chucks.

CITATION LIST

Patent Literature

[Patent Literature 1] Japanese Unexamined Patent Application Publication No. 2011-110676

SUMMARY OF INVENTION

Technical Problem

Patent Literature 1 discloses that a draw bar for attaching a jaw is clamped by a forming plug, and a tip of the draw bar is formed. According to this example, if a clamping portion is provided in the draw bar, the jaw is separated from a chuck body to a front of the chuck axis. In the case where the jaw is separated from a chuck body to a front of the chuck axis, the center (core) of the workpiece tends to shift from the rotation center (axis) of the chuck. An object of the present invention is to improve the accuracy of matching the center (core) of the workpiece with the rotation center (axis) of the chuck.

Solution to Problem

The present invention provides a chuck correction method for a chuck including a body, a plunger, and jaws, the body including a rear body and a front body provided in a front side of the rear body, the plunger provided inside the body and configured to move along an axis of the body, and the jaws each configured to move in a radial direction of the axis while guided by the front body along when the plunger moves, the chuck correction method comprising: a correction step comprising moving the front body in the radial direction of the axis with a position of the rear body keeping with respect to the axis in a state that a workpiece is clamped in the jaws, or tilting the front body with respect to the axis with the position of the rear body keeping with respect to the axis in the state that the workpiece is clamped in the jaws.

In the present invention, the correction step comprises moving the front body in the radial direction of the axis with a position of the rear body keeping with respect to the axis, or tilting the front body with respect to the axis with the position of the rear body keeping with respect to the axis. Thus, the present invention improves the accuracy of matching the center (core) of the workpiece with the rotation center (axis) of the chuck without forming the jaws.

Preferably, the chuck includes a guide bar extending from the rear body toward the front body, and the chuck correction method further comprises inserting the guide bar into a guide hole provided in the front body.

Preferably, the chuck includes a bolt configured to fix the front body to the rear body, and the chuck correction method further comprises moving the front body in the radial direction with the bolt loosened, and tightening the bolt after moving the front body in the radial direction.

Preferably, the chuck includes an urging means configured to bias the front body toward the rear body, and the chuck correction method further comprises attaching the urging means to the guide bar.

Preferably, the chuck includes an adjustment bolt, and the chuck correction method further comprises moving the front body in the radial direction by inserting the adjustment bolt into the front body and forcing the adjustment bolt to a side surface of the rear body or a side surface of the guide bar.

Preferably, the rear body includes an inclined sliding surface, the chuck includes an adjustment screw configured to move back and forth in the front body by a rotation operation from a side of a front surface of the front body, the adjustment screw including a tapered head configured to slide the sliding surface, and the chuck correction method further comprises moving the front body in the radial direction by moving the adjustment screw back and forth and sliding the tapered head on the sliding surface.

Preferably, the chuck includes a damper, and first bolts, and second bolts, the rear body includes first mounting surfaces, the first mounting surfaces are provided at intervals respectively, the damper bridges between adjacent first mounting surfaces and is fixed to the first mounting surfaces by the first bolts, the front body includes second mounting surfaces and is provided with a slider, and the damper is provided between the first and second mounting surfaces and the damper is fixed to the second mounting surfaces provided on a back surface of the front body by the second bolts, the slider is configured to change a deformation length of the damper, the correction step comprises tilting the front body with respect to the axis by changing a position of the slider in the state that the workpiece is clamped in the jaws.

Preferably, the chuck includes at least three or more parts provided at positions where the damper bridges between adjacent first mounting surfaces, and the parts provided at the positions are arranged at equal angular intervals.

BRIEF DESCRIPTION OF DRAWINGS

FIG. 1A is a cross-sectional view, and FIG. 1B is a partially modified cross-sectional view.

FIG. 3A is an assembly view, and FIG. 3B is an exploded view.

FIG. 4A is a perspective view of the chuck, and FIG. 4B is a cross-sectional view of the chuck.

FIG. 6A is a view showing a front body, a plunger, and jaws, and FIG. 6B is a view showing a back surface of the front body.

FIG. 8A is a perspective view of the chuck, FIG. 8B is a cross-sectional view of the chuck, FIG. 8C is a rear view of the front body, and FIG. 8D is a perspective view of an adjustment member.

FIGS. 9A to 9D are views showing the chuck according to a fourth embodiment, FIG. 9A is a perspective view of the chuck, FIG. 9B is a sectional view taken along line Y1-Y1, FIG. 9C is a view showing adjustment screws, and FIG. 9D is a sectional view taken along line Y2-Y2.

DESCRIPTION OF EMBODIMENTS

First Embodiment

Figure 1A:
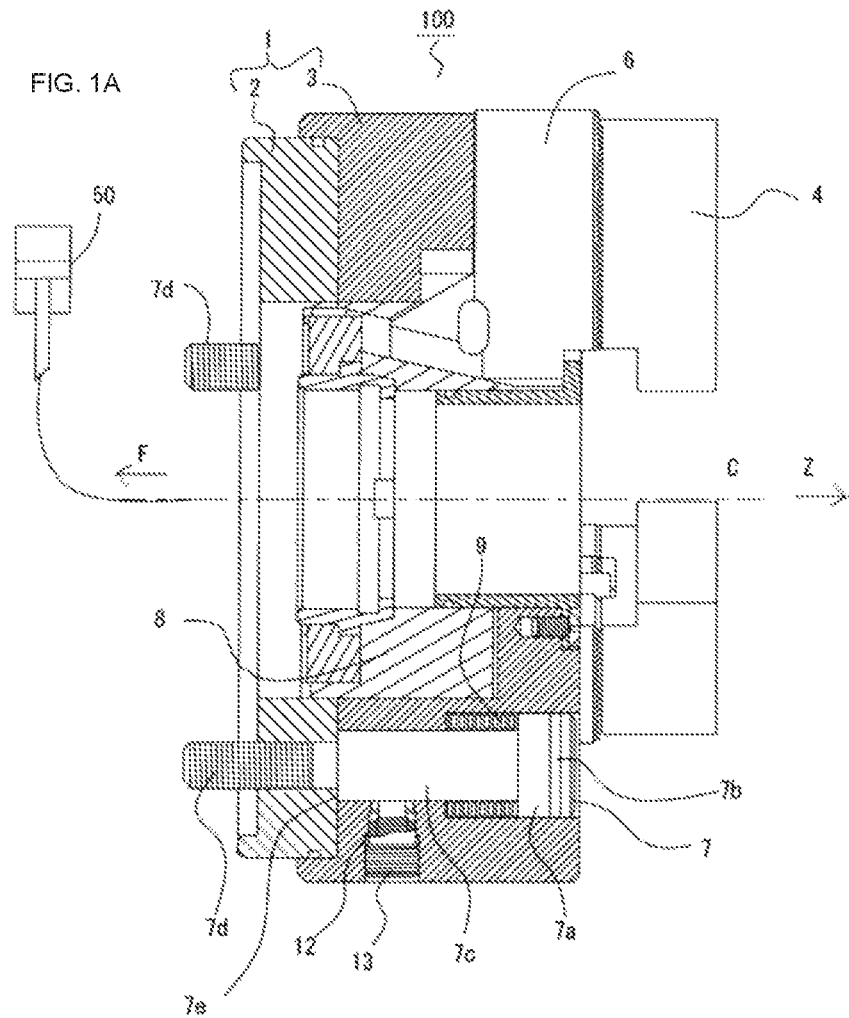
FIGS. 1A and 1B are views showing a chuck according to a first embodiment.
Figure 1B:
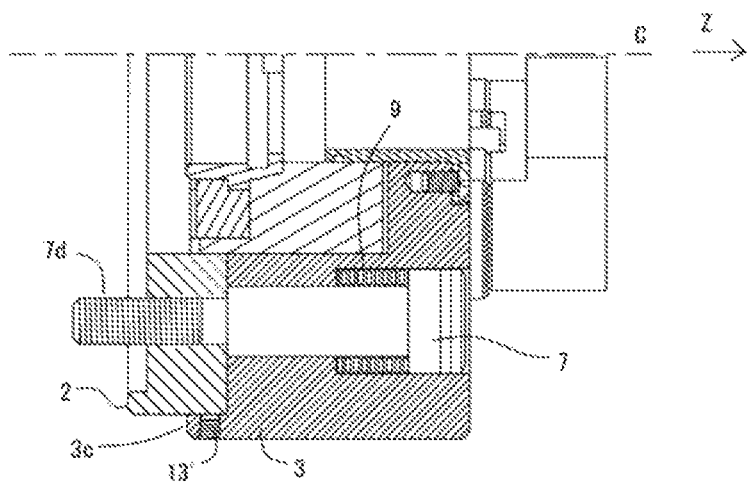
Figure 2:
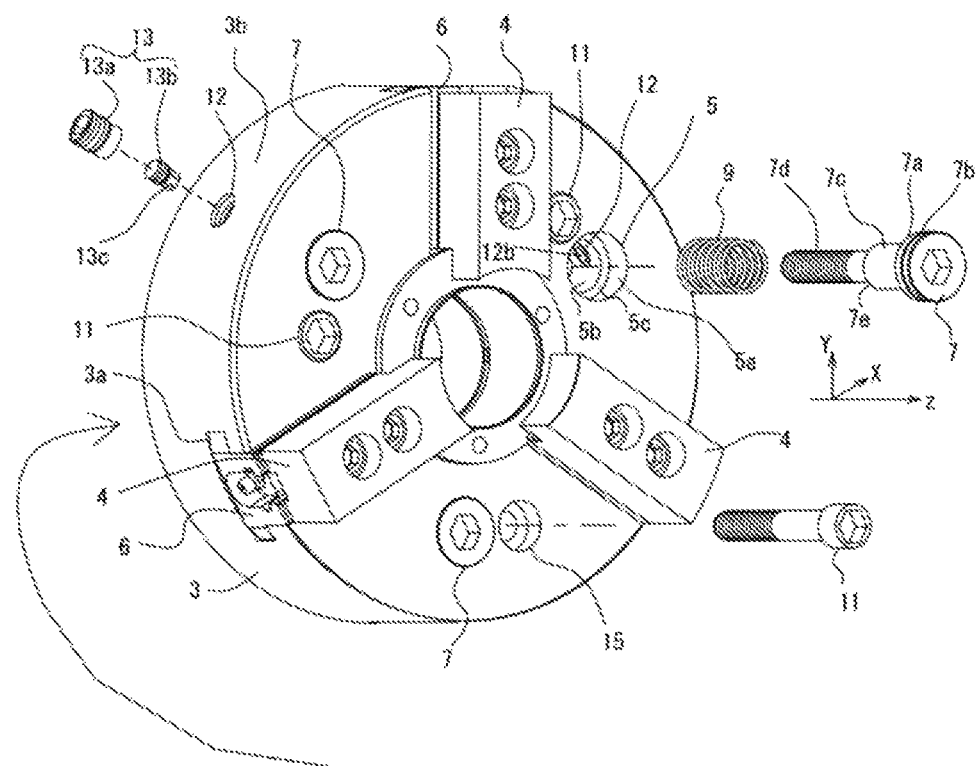
FIG. 2 is a perspective view of the chuck according to the first embodiment.
Figure 2:
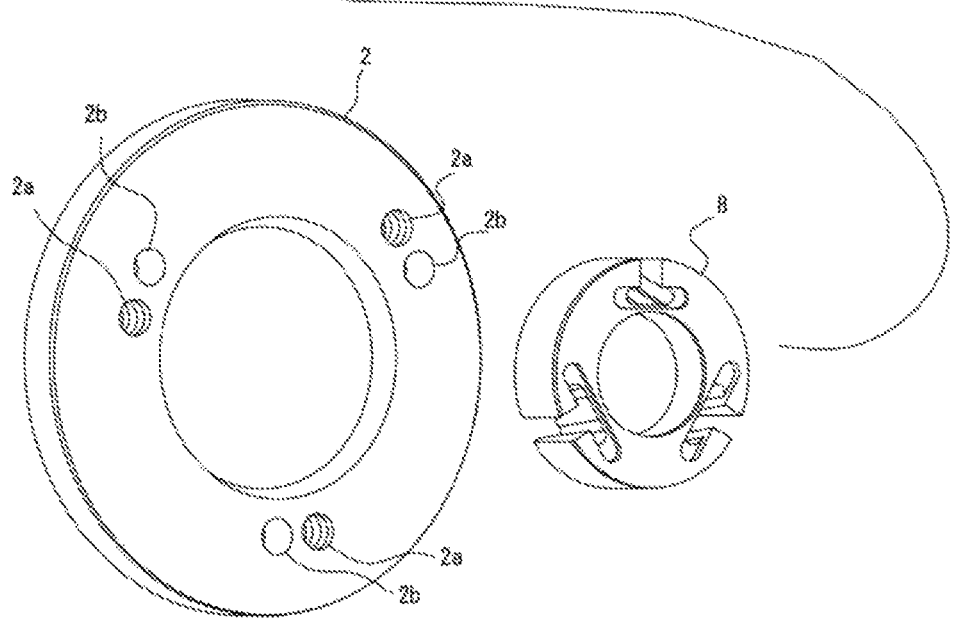

As shown in the cross-sectional view of the chuck 100 in FIG. 1A and the perspective view in FIG. 2, the chuck 100 includes three jaws 4 that are provided on a front (rightward direction in the figure) surface of the body 1 and move in a radial direction. The body 1 includes a rear body 2 and a cylindrical front body 3. The rear body 2 is configured to rotate by a spindle as machine tools (located on the left side of the rear body 2 in FIG. 1) about an axis C (shown by a dashed line in the figure) of the chuck 100 as the axis (the rotation center of the chuck). The front body 3 is forced against the rear body 2 by a spring 9 in the length direction of the axis C. On the other hand, in a plane (radial direction with respect to the axis C in the figure or X, Y directions in FIG. 2) perpendicular to Z direction (the length direction, of the axis C, in which the right direction in the figure is the front), a minute gap is provided between a collar portion 3c of the front body 3 and a side surface of the rear body 2, thus the front body 3 is slightly movable with respect to the rear body 2. A plunger 8 that moves back and forth on the axis C is inserted into the body 1. The body 1 is provided with master jaws 6. The master jaw 6 is guided by a slot 3a of the front body 3 and slides in the radial direction. The plunger 8 and the master jaw 6 are engaged so as to perform wedge action. When the plunger 8 is retracted by thrust F of the cylinder 50, the master jaw 6 slides in the radial direction due to the wedge action of the plunger 8 and the master jaw 6.

The guide bars 7 stands from the rear body 2 toward the front body 3 in parallel in the Z direction. The guide bar 7 includes an enlargement portion 7a having a groove into which a sliding ring 7b is inserted, a shaft body 7c, and a shaft screw 7d. A step portion 7e is provided between the shaft body 7c and the shaft screw 7d. A plurality of guide holes 5 are provided in the front body 3. The guide hole 5 includes a receiving surface portion 5a configured to receive the enlargement portion 7a, a through-hole portion 5b connected to the receiving surface portion 5a, and a step portion 5c between the receiving surface portion 5a and the through-hole 5b.

A spring 9 is provided between the enlargement portion 7a of the guide bar 7 and the step portion 5c. The spring 9 is an urging means configured to bias the front body 3 to the rear body 2. The shaft screw 7d is screwed directly to a fastening hole of the spindle as machine tools via a through-hole 2b of the rear body 2 or is screwed directly to a backplate fixed to the spindle. The guide bar 7 firmly fixes the rear body 2 to the spindle by the step portion 7e. Since the front body 3 is forced to the rear body 2 by the spring 9, relative position between the rear body 2 and the front body 3 is maintained. However, when the turning load of the workpiece on the chuck 100 is applied, it is not guaranteed that the relative position between the rear body 2 and the front body 3 is maintained. And the plurality of bolts 11 are screwed into the fixing holes 2a of the rear body 2 via through-holes 15 of the front body 3, thus fixing the front body 3 to the rear body 2 at a plurality of parts. Adjustment screw holes 12 are drilled from the peripheral surface portion 3b of the front body 3 to guide holes 5, and the adjustment screw hole 12 connects to through-hole 5b. An adjustment bolt 13 is screwed into the adjustment screw hole 12.

Figure 3A:
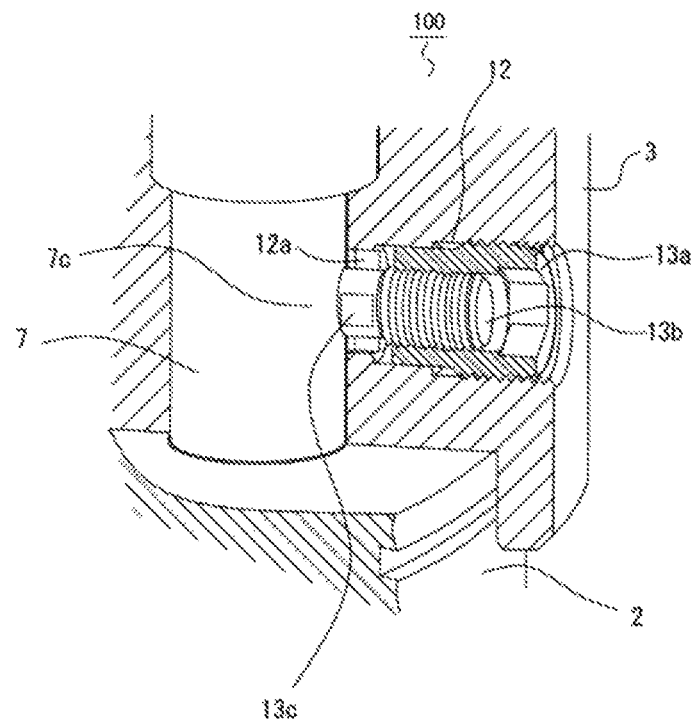
FIGS. 3A and 3B are a partially enlarged views of the chuck according to the first embodiment.
Figure 3B:
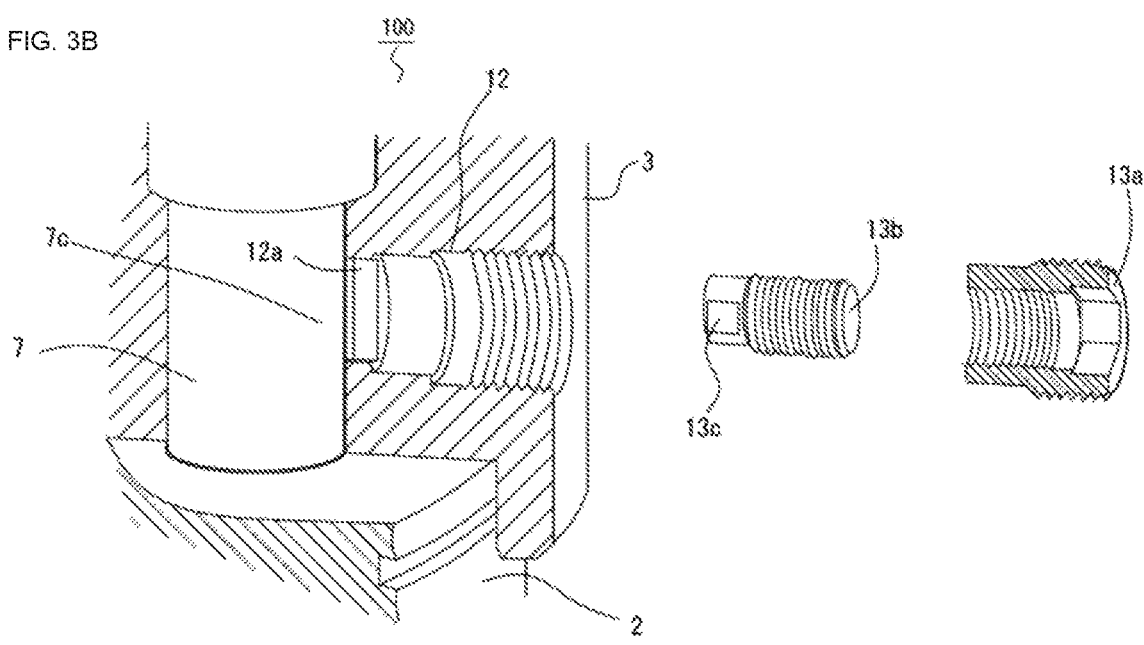

FIG. 3 is a partially enlarged view of the chuck 100 showing the details of the adjustment bolt 13. The adjustment bolt 13 has a double structure. That is, the adjustment bolt 13 has an outer screw 13a and an inner screw 13b provided inside the outer screw 13a. The outer screw 13a and the inner screw 13b have right-hand threads. A pitch of the inner screw 13b is slightly smaller than a pitch of the outer screw 13a. A flat surface 12a is formed on the inner side surface of the adjustment screw hole 12. The flat surface 12a faces the plane 13c provided on the side of the tip of the inner screw 13b, and prevents rotation of the inner screw 13b. When the outer screw 13a is turned one turn clockwise, the inner screw 13b advances by a difference between the pitch of the outer screw 13a and the pitch of the inner screw 13b. A tip of the inner screw 13b contacts with the shaft body 7c, of the guide bar 7, provided in the through-hole 5b. As described above, since the pitch of the inner screw 13b is smaller than the pitch of the outer screw 13a, when the outer screw 13a is turned, a moving distance in an axial direction of the inner screw 13b is smaller than a moving distance in an axial direction of the outer screw 13a. Thus, the adjustment bolt 13 can finely adjust the position of the guide bar 7.

Next, a correction step according to the correcting method of the clamping accuracy of the chuck 100 will be described. First, the bolts 11 screwed into the fixing holes 2a are loosened. Since the guide bar 7 fixes the rear body 2 to the spindle, a position and a posture of the rear body 2 with respect to the axis C are maintained. The spring 9 biases the front body 3 toward the rear body 2 so that the front body 3 does not come off or tilt even when the bolts 11 are loosened. The three adjustment bolts 13 are arranged on the front body 3 so that the three adjustment bolts 13 press side surfaces of the guide bars 7 from three directions.

First, the workpiece is clamped in the jaws 4, the three adjustment bolts 13 are pressed and pulled so that the core of the workpiece clamped in the jaws 4 is positioned on the axis C, and the front body 3 is moved slightly in the radial direction (in a vertical plane) of the axis C. When the bolts 11 are tightened in this state that the workpiece is clamped in the jaws 4, the front body 3 is fixed to the rear body 2 at a position with the clamping accuracy high, and thus the clamping accuracy of the chuck 100 can be corrected. In addition, by hitting the peripheral surface portion 3b of the front body 3 with a non-reaction hammer with all the adjustment bolts 13 loosened and moving the front body 3 slightly in the radial direction of the axis C so that the core of the workpiece clamped in the jaws 4 is positioned on the axis C, the clamping accuracy also can be corrected. The front body 3 translates along an end surface of the rear body 2. Then, since the front body 3 is forced against the rear body 2 by the spring 9, the front body 3 does not tilt with respect to the rear body 2. After that, the bolts 11 is tightened. According to the present embodiment, the clamping accuracy can be ensured by moving the front body 3 in the radial direction of the axis C so that the core of the workpiece clamped in the jaws 4 is positioned on the axis C. In this embodiment, the side surfaces of the guide bars 7 are pressed from three directions by three adjustment bolts 13. And as shown in FIG. 1B, the front body 3 may be moved in the radial direction with respect to the axis C so that the three adjustment bolts 13 arranged at equal angular intervals are pressed (only one adjustment bolt 13 is shown in the figure) from the collar portion 3c of the front body 3 to the side surface of the rear body 2 and thus the core of the workpiece is positioned on the axis C. Moving the front body may be performed in a state that the workpiece is clamped in the jaws. Alternatively, the swing of the workpiece is measured in a state that the workpiece is clamped in the jaws, and then the workpiece is detached from the jaws. After detached, the workpiece may be positioned on the axis C based on the swing of the workpiece. Further, in this embodiment, the chuck, in which the plunger 8 and the master jaw 6 are engaged to perform the wedge action, is shown. The embodiment is also applicable to chucks configured to move the master jaw in the other manners. The embodiment is applicable to, for example, a lever-type chuck as disclosed in Japanese Unexamined Patent Application Publication No. JPH6-277910. Further, the embodiment is also applicable to a chuck in which the master jaw 6 is not directly engaged with the plunger 8 and the master jaw 6 is driven via another member, for example, a wedge-shaped boosting mechanism.

Second Embodiment

Figure 4A:
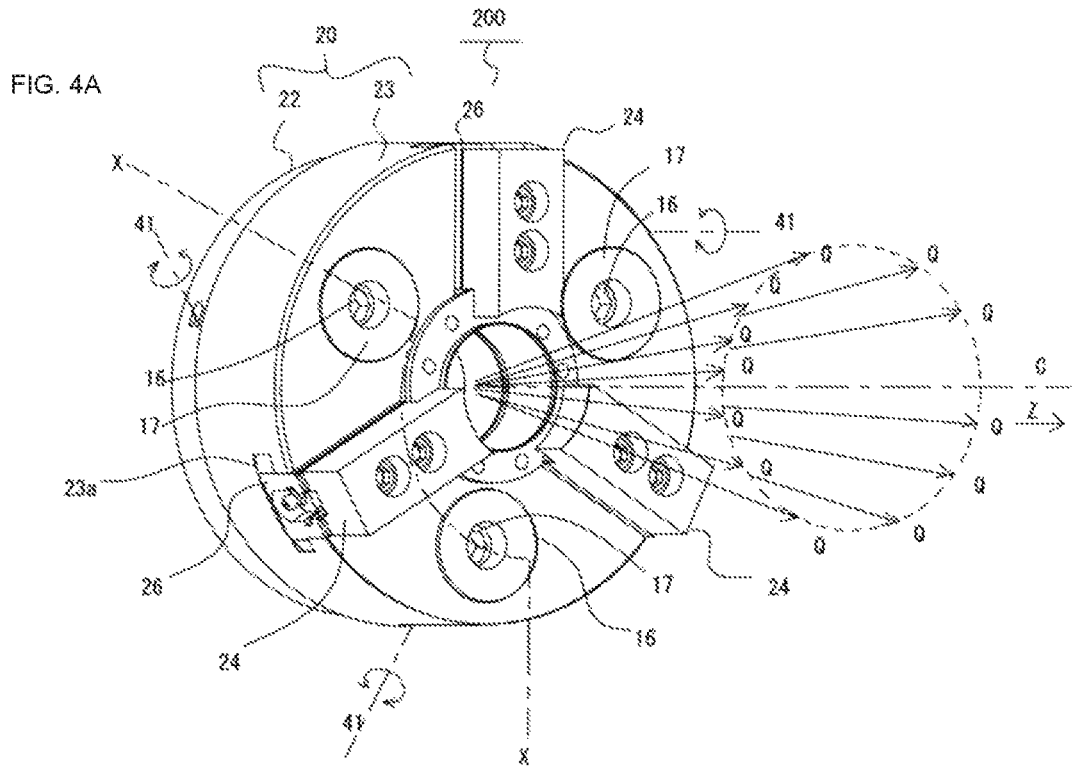
FIGS. 4A and 4B are views showing the chuck according to a second embodiment.
Figure 4B:
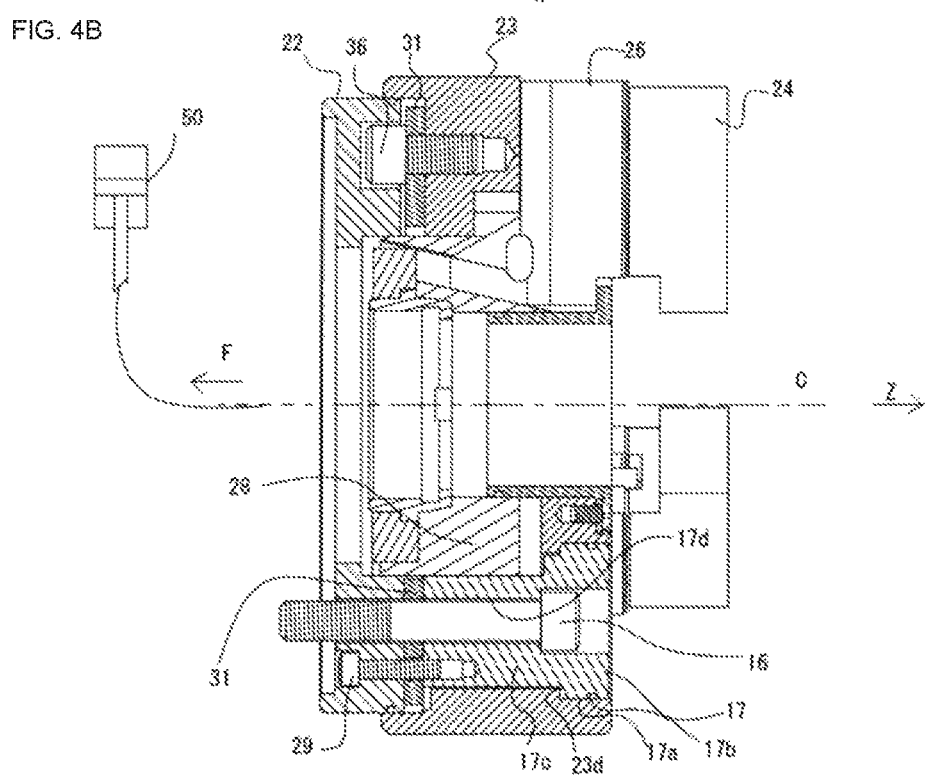

FIG. 4 is a view showing the chuck 200 according to the second embodiment, FIG. 4A is a perspective view of the chuck 200, and FIG. 4B is a cross-sectional view. The chuck 200 includes three jaws 24 that move in the radial direction and are provided on the front (rightward in the figure) surface of the body 20. The body 20 includes a rear body 22 and a cylindrical front body 23. The rear body 22 is rotated around the axis C of the chuck 200 by the spindle as machine tools (disposed on the left side of the rear body 22 in FIG. 4B). The front body 23 is slightly movable on the axis C with respect to the rear body 22. The plunger 28 that moves on the axis C is inserted in the body 20, and the master jaws 26 that slides in the slot 23a in the radial direction are provided in the front body 23, and the plunger 28 and the master jaw 26 are engaged to perform the wedge action. When the plunger 28 is retracted by the thrust F of the cylinder 50, the master jaws 26 slides in the radial directions due to the wedge action of the master jaws 26. Then, the front body 23 receives a force for moving on the axis C. The jaws 24 are fixed to the master jaws 26 respectively and are configured to clamp the workpiece.

A damper 31 having a plate like shape is provided between the rear body 22 and the front body 23. The details of fixing these components will be described later. A plurality of guide bars 17 (three in the embodiment) at equal angular intervals are fixed to the rear body 22 by bolts 16. The damper 31 is provided between the guide bars 17 and the rear body 22.

Figure 5:
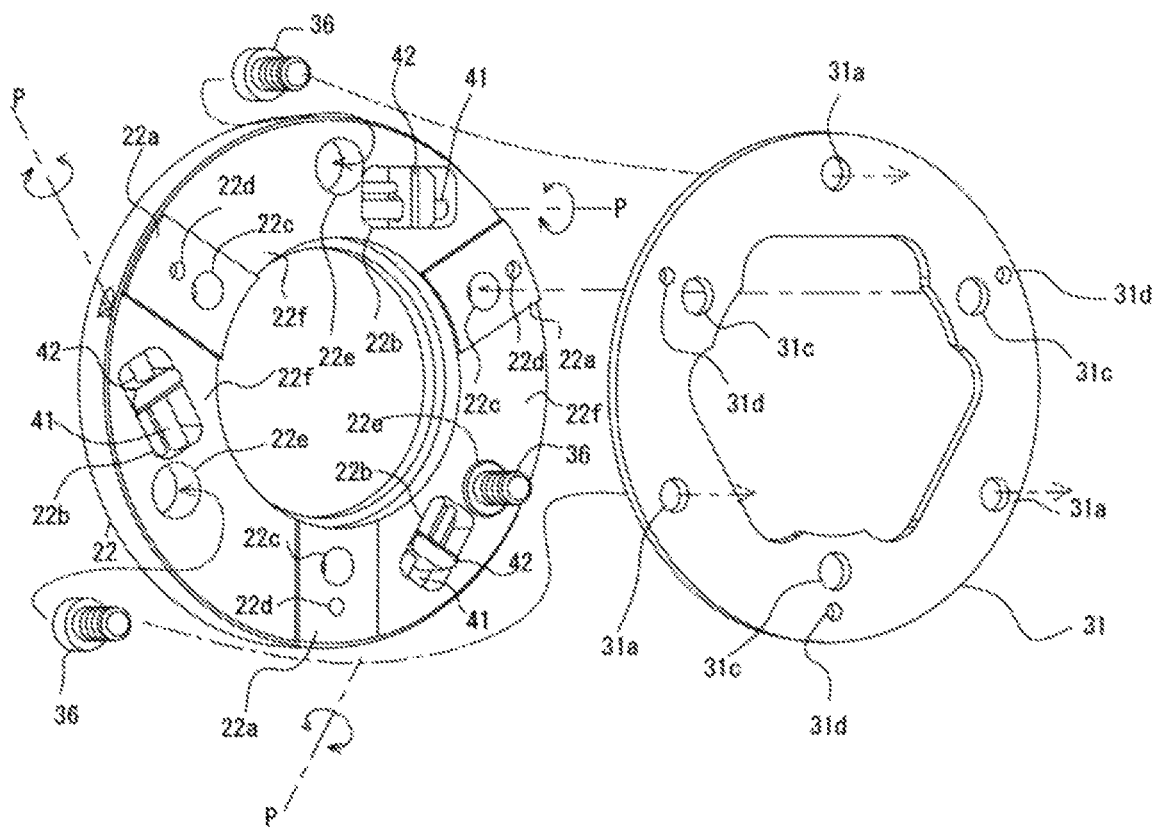
FIG. 5 is a partially exploded view of the chuck according to the second embodiment.

FIG. 5 is a perspective view of the rear body 22 and the damper 31. The rear body 22 has mounting surfaces 22a (first mounting surface) provided at equal angular intervals. The mounting surface 22a is for mounting the damper 31 and has large and small through-holes 22c and 22d. The through-hole 22d is used for fixing the guide bar 17 to the mounting surface 22a. The fan-shaped portions 22f between the adjacent mounting surfaces 22a are recessed rearward (to the left in the drawing). And the damper 31 is provided on the adjacent mounting surfaces 22a to bridge the fan-shaped portion 22f. The fan-shaped portion 22f has space for the damper to deform rearward elastically. Each of the fan-shaped portions 22f includes a groove 22b. Adjustment screws 41 are respectively provided in the grooves 22b in length direction of the grooves 22b. The adjustment screw 41 can be rotated from the outer peripheral side P of the rear body 22. Sliders 42 are respectively screwed into the adjustment screws 41 and move by rotating the adjustment screws 41. The positions of the grooves 22b behind the jaws 24 are the same angular positions of the jaws 24 around the axis C, and the positions of the mounting surfaces 22a behind the guide bars 17 are the same angular positions of the guide bars 17 around the axis C.

The damper 31 has a ring shape. Large through-holes 31c and small through-holes 31d are arranged at equal angular intervals, and each of the large through-holes 31c and each of the small through-holes 31d are arranged in the radial direction. In addition, each of through-holes 31a is provided between through-holes 31c and 31d, and the through-holes 31a are arranged at equal angular intervals. The through-holes 31c and 31d correspond to the through-holes 22c and 22d. The through-hole 31a is used for fixing the front body 23 to the damper 31.

Figure 6A:
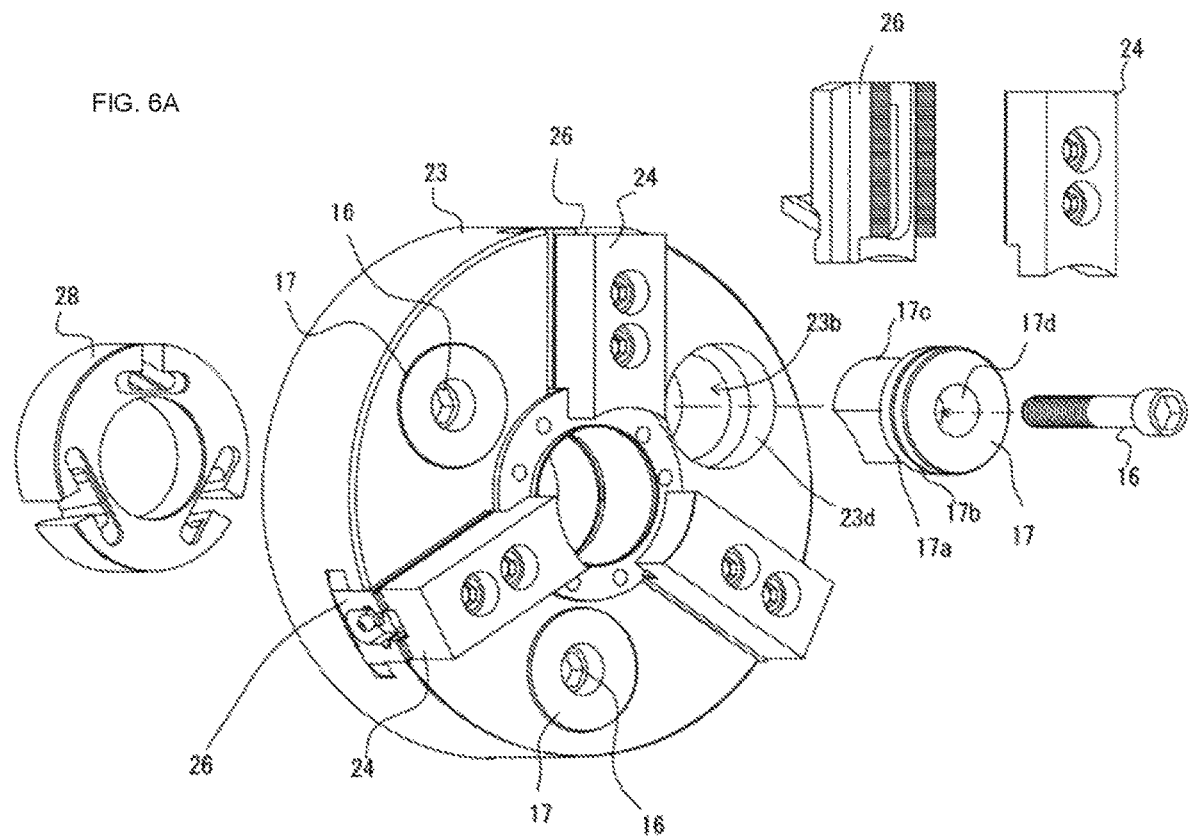
FIGS. 6A and 6B is partially exploded views of the chuck according to the second embodiment.
Figure 6B:
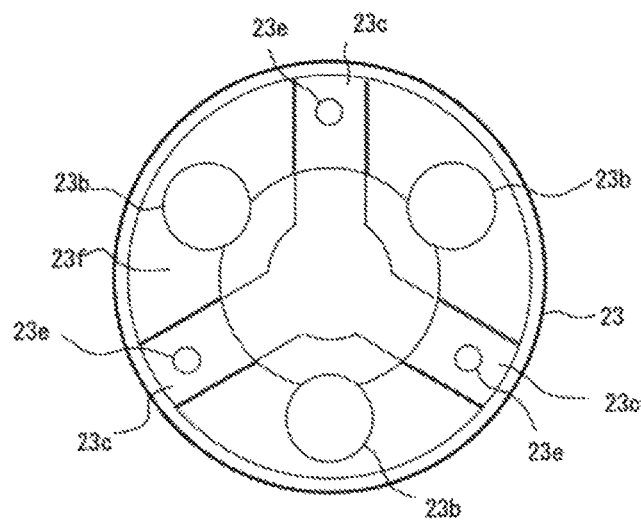

FIG. 6A is a perspective view of the front body 23, the plunger 28, the master jaw 26, and the guide bar 17. FIG. 6B is a view showing the back of the front body 23. When the plunger 28 is pulled backward relative to the front body 23, the master jaw 26 moves in the radial direction due to the wedge action of the plunger 28 and the master jaw 26. Each of the guide bars 17 (in this embodiment, the number of the guide bar 17 is three) has a sliding surface 17a. The sliding surface 17a is provided on a side surface of a head of the guide bar 17. Each of the guide bars 17 is provided with a groove for accommodating the ring-shaped seal 17b. A body 17c has an end configured to abut against the damper 31.

Guide holes 23b (in this embodiment, the number of the guide bar 17 is three) are provided at equal angular intervals in the front body 23, and the guide bars 17 are accommodated therein, respectively. An inner peripheral surface on a front side of the guide hole 23b is a sliding surface 23d that allows the front body 23 to slide on the axis C along the sliding surface 17a of the guide bar 17. A through-hole 17d at the center of the guide bar 17 accommodates a bolt 16 for fixing the guide bar 17 directly to the spindle as machine tools (not shown) or to the backplate fixed to the spindle. For the guide bar 17 to slide on the sliding surface 23d, at least small space is required between the sliding surface 17a and the sliding surface 23d. In this small range, the front body 23 is movable so that the guide bar 17 is tilted with respect to the axis C.

In FIG. 6B, three mounting surfaces 23c (second mounting surfaces) are provided at equal angular intervals on a back surface of the front body 23. The mounting surfaces 23*c* are provided behind the master jaws 26, and are provided at three places. Both the number of the mounting surfaces 23*c* and the number of the mounting surfaces 22*a* of the rear body 22 are three. Also, the number of the master jaws 26 is three. The mounting surface 23*c* protrudes rearward (front side in FIG. 6B) as compared with portions 23*f* on the same circumference. This configuration thus provides space for the planar damper 31 to deform. Each of the mounting surfaces 23*c* is provided with a hole 23*e* to which a bolt 36 (second bolt) is fixed via the through-hole 31*a* of the damper 31.

As shown FIG. 4, FIG. 5, FIG. 5, and FIG. 6, the damper 31 has the bolts 36 inserted into the through-hole 31*a*, and is fixed to the mounting surfaces 23*c* of the front body 23 by the bolts 36. The head of the bolt 36 is accommodated in an escape hole 22*e* provided in the rear body 22 with a margin. In the damper 31, bolts 29 are inserted into the through-holes 31*d* provided in sides of the through-hole 31*a* or bolts 16 are inserted into the through-holes 31*c* provided in sides of the through-hole 31*a*. And the damper 31 is fixed by the bolts 29 or the bolts 16 (first bolt) with respect to the spindle as machine tools or the mounting surfaces 22*a* of the rear body 22. Further, the guide bars 17 are fixed to the mounting surfaces 22*a* by bolts 16 (second bolts).

Since the damper 31 has the ring shape (see FIG. 5), the rear body 22, the front body 23, the rear body 22, and the front body 23 are fixed alternately in a circumferential direction to the damper 31. In this way, the damper 31 bridges between the mounting surfaces 22*a* provided at intervals, and the dampers 31 are fixed to the respective mounting surfaces 22*a* by the bolts 16. Parts of the damper 31, between the adjacent mounting surfaces 22*a* are fixed to the mounting surface 23*c* of the front body 23 by the bolt 36. The number of positions where the damper 31 bridges the adjacent mounting surfaces 22*a* are three in the embodiment, but may be more than three.

Referring to FIG. 4B, fixed state will be described. First, the rear body 22 is fixed to the spindle or the backplate by bolts 16 (with the guide bar 17 interposed). The damper 31 is fixed between the rear body 22 and the guide bar 17 by bolts 29. The front body 23 is fixed to the damper 31 by bolts 36. Therefore, the front body 23 is indirectly fixed to the spindle. Since the damper 31 is fixed by the bolts 16, 29, and 36, there is no wobble in the radial direction of the axis C, and the damper 31 allows the front body 23 to swing relative to the rear body 22 parallel to the axis C (including a slight inclination with respect to the axis C as described later). Since the damper 31 is thin, the damper 31 has low rigidity in the direction parallel to the axis C and is easily bent. However, the thinness of the damper 31 is less likely to affect radial deformation (displacement) about the axis C. That is, the rigidity of the damper 31 in the radial direction about the axis C is higher than the rigidity of the damper 31 in the direction parallel to the axis C. The damper 31 is easily deformed (displaced) in the direction parallel to the axis C, but is less likely to be deformed (displaced) in the radial direction about the axis C.

FIG. 7 is a view for explaining a structure to correct clamping accuracy by the chuck 200. FIG. 7A shows a cross section X-X in FIG. 4A. The X-X section is a view cut along the groove 22*b* and viewed from the outer peripheral side of the rear body 22. The damper 31 supports load from one mounting surface 23*c* between adjacent mounting surfaces 22*a*. When a force for moving the front body 23 on the axis C is applied by the thrust F of the cylinder 50, the damper 31 is deformed in the space of the fan-shaped portion 22*f*. An adjustment screws 41 can be rotated from the outer peripheral surface of the rear body 22. By rotating the adjustment screw 41, the positions of the sliders 42 are changed. As a result, positions at which the damper 31 contacts the sliders 42 are changed, so that the spring constant of the damper 31 can be arbitrarily changed. A rear side of the slider 42 contacts the rear body 22 to transfer compressive force from the damper 31 to the rear body 22.

Figure 7A:
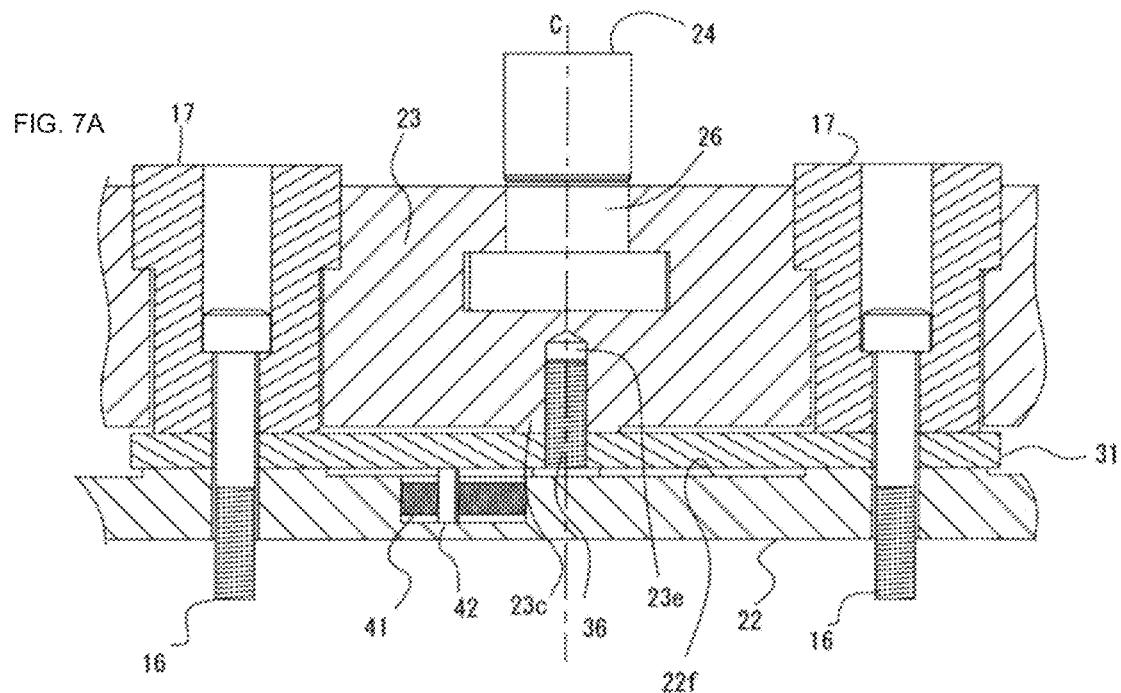
FIG. 7A is a view for explaining a structure to correct clamping accuracy, and is a sectional view taken along line X-X.
Figure 7B:
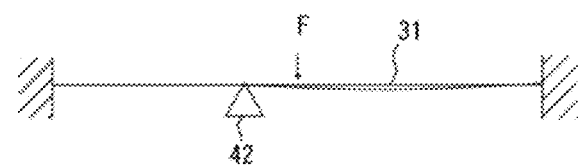
FIG. 7B is a view for explaining a structure to correct clamping accuracy, and is a diagram showing principle in relation to correcting clamping accuracy.
Figure 7C:
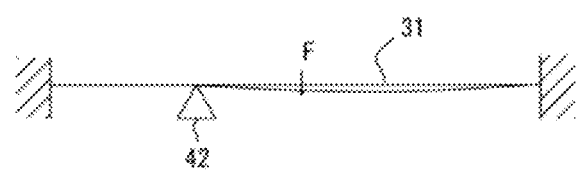
FIG. 7C is a view for explaining a structure to correct clamping accuracy, and is a diagram showing principle in relation to correcting clamping accuracy.
Figure 7D:
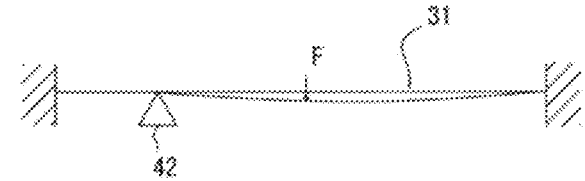
FIG. 7D is a view for explaining a structure to correct clamping accuracy, and is a diagram showing principle in relation to correcting clamping accuracy.

FIGS. 7B to 7D are diagrams schematically showing displacements of the damper 31 at the respective positions of the three mounting surfaces 23*c*. FIG. 7B shows a state in which the slider 42 is closer to the center (fixed position of the mounting surface 23*c*), and FIGS. 7C and 7D shows states in which the slider 42 is away from the center. When the force for moving the front body 23 on the axis C is applied by the thrust F of the cylinder 50, the damper 31 is deformed in the space of the fan-shaped portion 22*f*. The slider 42 and the rear body 22 are arranged a back side of the damper 31, and the length of deformation of the damper 31 is short in FIG. 7B, and long in FIGS. 7C and 7D. Therefore, the spring constant of the damper 31 can be changed by changing the fixed position of the mounting surface 23*c*.

Next, the correction step according to a chuck correction method for the chuck 200 to correct the clamping accuracy will be described. First, when the thrust F of the cylinder 50 is applied, the damper 31 is elastically deformed by the force from the front body 23, and the front body 23 is pulled leftward. Since the bolts 16 fix the rear body 22 to the spindle with the guide bar 17 interposed therebetween, posture of the rear body 22 in the Z direction is maintained. Positions of the three sliders 42 are controlled by adjustment screws 41 respectively. When the spring constant of the damper 31 is reduced, the amount of deformation increases and the distance that the front body 23 moves on the axis C increases even with the same thrust of the cylinder 50. On the other hand, when the spring constant is increased, the amount of deformation decreases, and the distance that the front body 23 moves on the axis C decreases even with the same thrust of the cylinder 50. Thus, as shown in FIG. 4A, the front body 23 can be slightly tilted in any direction around the axis C by changing the positions of the sliders 42 using the adjustment screws 41. By making a difference in the deformation amount of the damper 31 by the adjustment screws 41 and the sliders 42, the front body 23 is slightly tilted and the core of the workpiece coincides with the center, thus performing adjustment of the core of the workpiece. In this way, the adjustment screw 41 can be used to make extremely fine adjustments so that the core of the workpiece clamped in the clamping surfaces of the jaws 24 is aligned with the axis C. In the present embodiment, the positions of the sliders 42 are set at equal angular intervals, but are not limited to this arrangement. The positions of the sliders 42 may be any arrangements as long as the axis C is included in a figure surrounded by straight lines connecting at least three sliders 42. Configuration of the present embodiment allows the front body 23 to be inclined with respect to the axis C so that the core of the workpiece clamped in the jaws is positioned on the axis C. Thus, this configuration improves the clamping accuracy without forming the jaws. Then, tilting the front body may be performed when the workpiece is clamped in the jaws. Alternatively, the swing of the workpiece is measured when the workpiece is clamped in the jaw. After the swing of the workpiece measured, then the workpiece is detached from the jaws. After the workpiece detached, tilting the front body may be performed.

Third Embodiment

FIG. 8 is a view showing a chuck 300 according to a third embodiment. The same components as those in the first and second embodiments are denoted by the same reference signs. In the second embodiment, the positions of the sliders 42 are changed by rotating the adjustment screw 41 from the outer peripheral surface of the rear body 22 to change the spring constant of the damper 31. In the third embodiment, by rotating adjustment members 51 from the front side (the right side in FIG. 8A) of the front body 43, positions of the sliders 51b are changed and the spring constant of the damper 45 is changed.

Figure 8A:
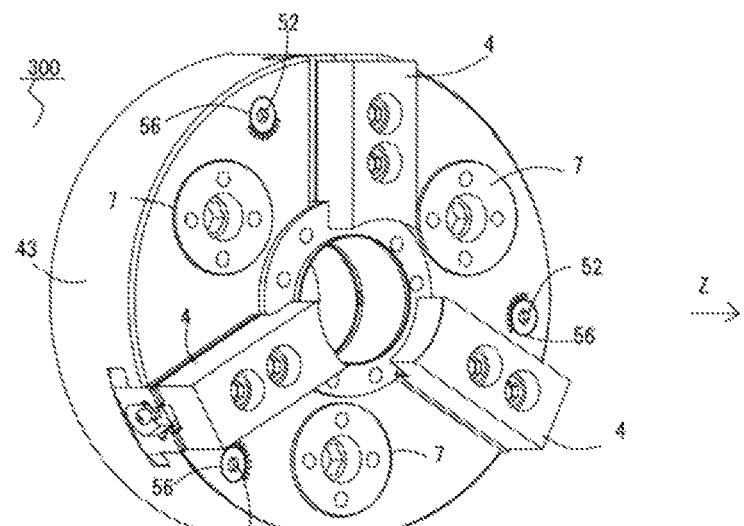
FIGS. 8A to 8D are views showing the chuck according to a third embodiment.
Figure 8B:
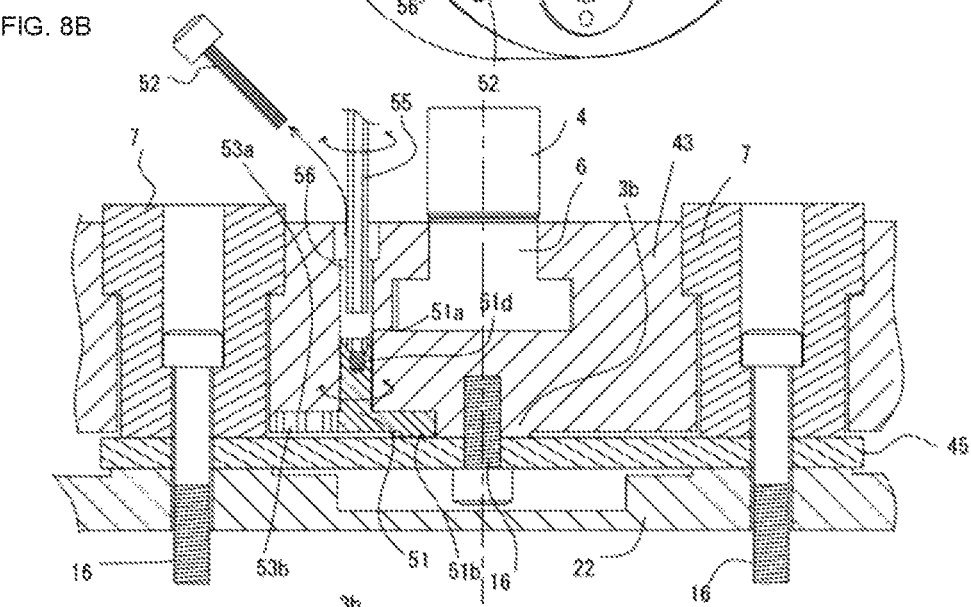
Figure 8C:
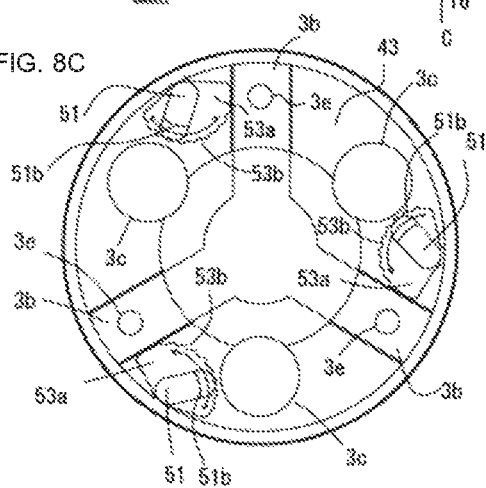
Figure 8D:
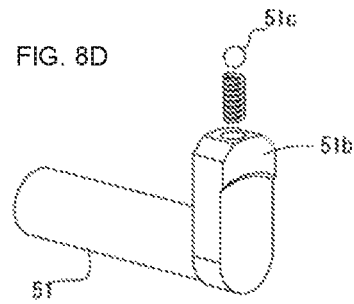

In FIG. 8A, a plurality of (three in the embodiment) maintenance holes 56 provided at equal angular intervals are provided on the front side of the front body 43. The sealing bolts 52 are screwed into female screw holes 51d of the adjustment members 51, and the maintenance holes 56 are sealed by the sealing bolts 52. In FIG. 8B, when the sealing bolt 52 is taken out from the maintenance hole 56, an operation end 51a of the adjustment member 51 appears. The sealing bolt 52 prevents intrusion of cutting powder. The operation end 51a is a female groove for inserting a hexagon wrench 55. The workers can rotate the adjustment member 51 provided between the front body 43 and the damper 45 by operating the hexagon wrench 55. The female screw hole 51d is provided on an inner side of the operation end 51a. The adjustment member 51 passes through the front body 43 and faces the damper 45. As shown in FIG. 8D, the adjustment member 51 has a slider 51b provided on a side facing the damper 45, and the slider 51b contacts with the damper 45 while the damper 45 is being deformed. Recesses 53a for swinging the sliders 51b are provided on the front body 43 side. When the adjustment member 51 is rotated, the position at which the slider 51b contacts the damper 45 changes, and the spring constant of the damper 45 can be changed. The rear side of the slider 51b contacts the front body 43 to transfer pressing force from the damper 45 to the front body 43.

In order to easily change the rotation angle of the adjustment member 51 discretely, latching notches 53b are provided at equal angular intervals on the recess 53a side, and the adjustment member 51 is provided with claws 51c that elastically back and forth with respect to the latching notch 53b. After adjusting the rotation angle of the adjustment member 51 using the hexagon wrench 55, the adjustment member 51 can be fixed by tightening the sealing bolt 52. In the above-described embodiment, the adjustment member 51 is fixed by tightening the sealing bolt 52. However, as another embodiment for fixing the adjustment member 51 are below. Configuration of another embodiment may include a female member extending from the side surface of the front body 43 to the side surface of the adjustment member 51, and a bolt screwed into the female screw hole. This configuration of another embodiment also can fix the adjustment member 51.

According to the third embodiment, the spring constant of the damper 45 can be changed by changing the position of the slider 51b from the front side of the front body 43, which is often exposed in most machine tools. Further, as compared with the second embodiment where the adjustment screw 41 and the slider 42 are provided on the rear body 22, the third embodiment can reduce the number of parts the manufacturing costs.

Fourth Embodiment

FIG. 9 is a view showing the chuck 400 according to the fourth embodiment. The fourth embodiment is a modification of the first embodiment. In the first embodiment, adjustment bolts 13 press the side surface of the guide bars 7, thus moving the front body 3 in the radial direction of the axis C. Then, the guide bars 7 are inserted in the side surface of the front body 3 or the guide hole of the front body 3. In the fourth embodiment, the adjustment screws 61 are operated from the front side of the front body 63 to move the front body 63 in the radial direction about the axis C. The same components as those of the first embodiment are denoted by the same reference signs.

A plurality (three in this embodiment) of adjustment screws 61 are provided at equal angular intervals with respect to the chuck 400, and an operation ends 61a of the adjustment screw 61 is exposed on the front side of the front body 63. The operation end 61a is a female groove for receiving the hexagon wrench and is used for rotating the adjustment screw 61. The adjustment screw 61 includes a shaft portion 61b having a screw and can back and forth in the direction of the axis C inside the front body 63. A head 61c of the adjustment screw 61 is tapered, and slides on an inclined sliding surface 62a provided on the rear body 62 side. The head 61c moves in the direction of the axis C and slides on the sliding surface 62a, thus moving the front body 63 in the radial direction about the axis C.

DESCRIPTION OF REFERENCE SIGNS 1, 20: body
2, 22, 62: rear body
3, 23, 43, 63: front body
4, 24: jaw
5, 23b: guide hole
6, 26: master jaw
7, 17: guide bar
8, 18: plunger
9: spring
11, 16, 29, 36: bolt
12: adjustment screw hole
13: adjustment bolt
21a, 23c: mounting surface
31, 45: damper
50: cylinder
41: adjustment screw
42: slider
51: adjustment member
61: adjustment screw
100, 200: chuck

The invention claimed is:
1. A chuck correction method for a chuck including a body, a plunger, and jaws,
the body including a rear body and a front body provided at a front side of the rear body,
the plunger provided inside the body and configured to move along an axis of the body, and
the jaws each configured to move along a radial direction with respect to the axis while guided by the front body when the plunger moves,
the chuck also includes guide bars extending from the rear body toward the front body,
the guide bars each configured to be inserted into guide holes provided in the front body and configured to fix the rear body to the spindle as machine tools,
the chuck correction method comprising:
a correction step comprising
moving the front body in the radial direction of the axis with a position of the rear body keeping with respect to the axis so that center of a workpiece is positioned on the axis in a state that a workpiece is clamped in the jaws, or tilting the front body with respect to the axis with a position of the rear body remaining stationary with respect to the axis so that the center of the workpiece is positioned on the axis in the state that the workpiece is clamped in the jaws, the correction step is performed in a state that the workpiece is clamped in the jaws, or performed after measuring the swing of the workpiece in a state that the workpiece is clamped in the jaws and then detaching the workpiece from the jaws.

2. The chuck correction method of claim 1, wherein the chuck includes a bolt configured to fix the front body to the rear body, and the chuck correction method further comprises moving the front body in the radial direction with the bolt loosened, and tightening the bolt after moving the front body in the radial direction.

3. The chuck correction method of claim 2, wherein the rear body includes an inclined sliding surface, the chuck includes an adjustment screw configured to move back and forth in the front body by a rotation operation from a side of a front surface of the front body, the adjustment screw including a tapered head configured to slide the sliding surface, and the chuck correction method further comprises moving the front body in the radial direction by moving the adjustment screw back and forth and sliding the tapered head on the sliding surface.

4. The chuck correction method of claim 1, wherein the chuck includes an urging means configured to bias the front body toward the rear body, and the chuck correction method further comprises attaching the urging means to the guide bar.

5. The chuck correction method of claim 1, wherein the chuck includes an adjustment bolt, and the chuck correction method further comprises moving the front body in the radial direction by inserting the adjustment bolt into the front body and forcing the adjustment bolt to a side surface of the rear body or a side surface of the guide bar.

6. The chuck correction method of claim 1, wherein the chuck includes a damper, and first bolts, and second bolts, the rear body includes first mounting surfaces, the first mounting surfaces are provided at intervals respectively, the damper bridges between adjacent first mounting surfaces and is fixed to the first mounting surfaces by the first bolts, the front body includes second mounting surfaces and is provided with a slider, and the damper is provided between the first and second mounting surfaces and the damper is fixed to the second mounting surfaces provided on a back surface of the front body by the second bolts, the slider is configured to change a deformation length of the damper, the correction step comprises tilting the front body with respect to the axis by changing a position of the slider so that the core of the workpiece is positioned on the axis in the state that the workpiece is clamped in the jaws.

7. The chuck correction method of claim 6, wherein the chuck includes at least three or more parts provided at positions where the damper bridges between adjacent first mounting surfaces, and the parts provided at the positions are arranged at equal angular intervals.

* * * * *